(12) United States Patent
Pruitt et al.

(10) Patent No.: US 7,780,879 B2
(45) Date of Patent: Aug. 24, 2010

(54) METHOD FOR MAKING CONTACT LENSES

(75) Inventors: John Dallas Pruitt, Suwanee, GA (US);
Lynn Cook Winterton, Alpharetta, GA (US); Bernhard Seiferling, Goldbach (DE); Jüergen Vogt, Flueh (CH); Harald Bothe, Wiesbaden (DE)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 12/316,993

(22) Filed: Dec. 18, 2008

(65) Prior Publication Data

US 2009/0160074 A1 Jun. 25, 2009

Related U.S. Application Data

(60) Provisional application No. 61/008,554, filed on Dec. 20, 2007.

(51) Int. Cl.
  B29D 11/00 (2006.01)
  G02B 1/12 (2006.01)
  B29C 35/08 (2006.01)
  B29C 33/60 (2006.01)
  C08J 5/00 (2006.01)
  A61K 6/083 (2006.01)

(52) U.S. Cl. .................... 264/1.36; 264/496; 264/300; 264/319; 264/331.13; 264/2.6; 522/76

(58) Field of Classification Search ............ None
See application file for complete search history.

(56) References Cited

U.S. PATENT DOCUMENTS

| | | | |
|---|---|---|---|
| 4,130,706 A | 12/1978 | Plambeck, Jr. | 526/245 |
| 4,159,292 A | 6/1979 | Neefe | |
| 4,444,711 A | 4/1984 | Schad | |
| 4,460,534 A | 7/1984 | Boehm | |
| 4,534,916 A | 8/1985 | Wichterle | 264/2.1 |
| 4,721,800 A | 1/1988 | Chapman | |
| 4,826,901 A | 5/1989 | Ittmann et al. | 324/145 |
| 4,828,561 A | 5/1989 | Woodroof | |
| 4,865,984 A | 9/1989 | Nemerson | |
| 4,929,707 A | 5/1990 | Nagata | |
| 4,937,369 A | 6/1990 | Chapman | |
| 4,946,923 A | 8/1990 | Nagata | |
| 4,955,580 A | 9/1990 | Seden | |
| 4,983,332 A | 1/1991 | Hahn et al. | 264/1.1 |
| 5,013,496 A | 5/1991 | Nagata | |
| 5,021,503 A | 6/1991 | Nagata | |
| 5,063,090 A | 11/1991 | Wannlund | |
| 5,091,551 A | 2/1992 | Chapman | |
| 5,126,388 A | 6/1992 | Nagata | |
| 5,143,660 A | 9/1992 | Hamilton | |
| 5,217,743 A | 6/1993 | Farah | |
| 5,229,162 A | 7/1993 | Chapman | |
| 5,264,161 A | 11/1993 | Druskis et al. | 264/2.6 |
| 5,374,434 A | 12/1994 | Clapp | |
| 5,380,904 A | 1/1995 | Chapman | |
| 5,508,317 A | 4/1996 | Müller | |
| 5,527,925 A | 6/1996 | Chabrecek | |
| 5,542,978 A | 8/1996 | Kindt-Larsen | |
| 5,567,456 A | 10/1996 | Clapp | |
| 5,583,163 A | 12/1996 | Müller | |
| 5,583,463 A | 12/1996 | Merritt | |
| 5,587,009 A | 12/1996 | Besse | |
| 5,594,088 A | 1/1997 | Nagata | |
| 5,665,840 A | 9/1997 | Pöhlmann | |
| 5,712,356 A | 1/1998 | Bothe | |
| 5,753,730 A | 5/1998 | Nagata | |
| 5,760,100 A | 6/1998 | Nicolson | |
| 5,789,464 A | 8/1998 | Müller | |
| 5,843,346 A | 12/1998 | Morrill | |
| 5,849,810 A | 12/1998 | Müller | |
| 5,849,811 A | 12/1998 | Nicolson | |
| 5,849,841 A | 12/1998 | Mühlebach | |
| 5,894,002 A | 4/1999 | Boneberger | |
| 5,942,558 A | 8/1999 | Korb | |
| 6,039,913 A | 3/2000 | Hirt | |
| 6,113,970 A | 9/2000 | Rainey | |
| 6,165,408 A | 12/2000 | Steinmann | |
| 6,210,743 B1 | 4/2001 | Clapp | |
| 6,221,303 B1 | 4/2001 | Steinmann | |
| 6,303,687 B1 | 10/2001 | Müller | |
| 6,367,929 B1 | 4/2002 | Maiden | |
| 6,441,209 B1 | 8/2002 | Copeland | |
| 6,451,871 B1 | 9/2002 | Winterton | |
| 6,472,489 B1 | 10/2002 | Stockinger | |
| 6,479,587 B1 | 11/2002 | Stockinger | |
| 6,492,478 B1 | 12/2002 | Steinmann | |
| 6,521,283 B1 | 2/2003 | Yianni | |
| 6,627,124 B1 * | 9/2003 | Herbrechtsmeier et al. | 264/1.36 |
| 6,793,973 B2 | 9/2004 | Winterton | |
| 6,811,805 B2 | 11/2004 | Gilliard | |
| 6,822,016 B2 | 11/2004 | McCabe | |
| 6,844,458 B2 | 1/2005 | Copeland | |

(Continued)

FOREIGN PATENT DOCUMENTS

WO   WO2005027933 A1   3/2005

OTHER PUBLICATIONS

Samuel Zalipsky, Chemistry of polyethylene glycol conjugates with biologically active molecules, Advanced Drug Delivery Reviews, vol. 16, Issues 2-3, Long-circulating Drug Delivery Systems, Sep. 1995, pp. 157-182, http://www.sciencedirect.com/science/article/B6T3R-3Y5FPJH-3/2/77092aa043aa4cbb508488000d075b07.*
PCT International Search Report.
PCT Written Opinion of the International Searching Authority.

*Primary Examiner*—Christina Johnson
*Assistant Examiner*—Benjamin Schiffman
(74) *Attorney, Agent, or Firm*—Sheng-Hsin Hu

(57) ABSTRACT

The instant invention pertains to a method and a fluid composition for producing contact lenses with improved lens quality and with increased product yield. The method of the invention involves adding a phospholipid into a fluid composition including a lens-forming material in an amount sufficient to reduce an averaged mold separation force by at least about 40% in comparison with that without the phospholipids.

14 Claims, No Drawings

U.S. PATENT DOCUMENTS

| | | |
|---|---|---|
| 6,849,210 B2 | 2/2005 | Bothe |
| 7,091,283 B2 * | 8/2006 | Muller et al. .............. 525/292 |
| 7,195,726 B1 | 3/2007 | Niswander |
| 7,387,759 B2 | 6/2008 | Kelly |
| 2003/0209818 A1 * | 11/2003 | Bothe et al. .............. 264/1.32 |
| 2004/0082680 A1 | 4/2004 | Phelan |
| 2005/0113549 A1 | 5/2005 | Devlin |
| 2007/0037897 A1 | 2/2007 | Wang et al. .............. 523/106 |
| 2007/0145616 A1 | 6/2007 | Vanderlaan |
| 2007/0182919 A1 | 8/2007 | Vanderlaan |
| 2007/0244211 A1 | 10/2007 | Phelan |
| 2008/0015315 A1 | 1/2008 | Chang |
| 2008/0143003 A1 | 6/2008 | Phelan |
| 2008/0143958 A1 | 6/2008 | Medina |
| 2008/0152800 A1 | 6/2008 | Bothe |
| 2008/0174035 A1 | 7/2008 | Winterton |
| 2008/0231798 A1 | 9/2008 | Zhou |
| 2008/0234457 A1 | 9/2008 | Zhou |

* cited by examiner

METHOD FOR MAKING CONTACT LENSES

This application claims the benefit under 35 U.S.C. §119 (e) of U.S. provisional application Ser. No. 61/008,554 filed Dec. 20, 2007, herein incorporated by reference in its entirety.

The present invention is related to a method for making contact lenses. In particular, the present invention is related to a method for facilitating mold separation and lens removal from a mold in a cast-molding process of contact lenses using a phospholipid as mold releasing agents, thereby enhancing the quality and yield of produced contact lenses.

BACKGROUND

Contact lenses can be manufactured economically in a mass production manner by a conventional cast-molding process involving disposable molds (e.g., PCT published patent application No. WO/87/04390, EP-A 0 367 513, U.S. Pat. No. 5,894,002, all of which are herein incorporated by reference in their entireties) or by an improved cast-molding process involving reusable molds and curing under a spatial limitation of actinic radiation (U.S. Pat. Nos. 5,508,317, 5,583,163, 5,789,464 and 5,849,810). A critical step in the production of lenses using molds is mold opening and lens releasing from the mold without damaging the lens. Subsequent to the completion of the contact lens molding process, the polymerized lens tends to strongly adhere to the mold. During mold opening and removing the contact lenses from the mold, cracks, flaws and/or tears may occur in the lenses or in the worst case the contact lenses even break totally. Contact lenses having such defects have to be discarded and lower the overall production yield.

Several methods have been developed or proposed. One method for releasing lenses is to hydrate the lens, namely, a lens-in-mold assembly after mold separation is placed in a hydration tank filled with water. Often hydration alone does not release the lenses from the molds. The lenses must then be gently removed from molds by hand. Such hand-assisted lens removal increases the likelihood of lens damage. U.S. Pat. No. 5,264,161 discloses an improved method for releasing a lens from a mold, in which surfactants are added to the hydration bath to facilitate the release of lenses from molds. However, the utilization of surfactants in a hydration bath does not provide a more effortless mold separation. Lens damage incurred during mold separation may not be minimized by hydrating lenses.

Another method of lens release is to incorporate surfactants as internal mold releasing agents into molds themselves as illustrated by U.S. Pat. No. 4,159,292. Incorporation of internal mold releasing agents in molds can decrease adhesion between lenses and molds. However, when a mold is used repeatedly, surfactants as internal mold releasing agent can be exhausted by exudation.

A further method of lens release is to apply external mold releasing agents (e.g., surfactants) in the form of a film or coating onto to the molding surfaces of a mold (e.g., those disclosed in U.S. Pat. Nos. 4,929,707 and 5,542,978). When external mold releasing agents are used, a portion of the agents used for treating the molding surfaces of the mold can migrate to the surface and interior of the polymerized lens.

A still further method of lens release is to incorporate internal mold releasing agents into a lens-forming composition for making contact lenses. The internal mold releasing agent can be a surfactant (U.S. Pat. Nos. 4,534,916, 4,929,707, 4,946,923, 5,013,496, 5,021,503, 5,126,388, 5,594,088, 5,753,730) or a non-polymerizable polymer (U.S. Pat. No. 6,849,210). By incorporation of an internal mold releasing agent in a lens-forming composition (or lens formulation), the adhesion between molds and lenses may be reduced, a relatively smaller force may be required to separate mold, and lenses may be removed from molds with less effort. A portion of the internal mold releasing agent need migrate to the surface of the polymerized lens in order to be effective to reduce the adhesion between molds and lenses. A great effort has been made to develop technologies for cast molding of hydrogel contact lenses with high precision, fidelity and reproducibility and at low cost. One of such manufacturing technologies is the so-called LIGHTSTREAM TECHNOLOGY™ (CIBA Vision) involving a lens-forming composition being substantially free of monomers and comprising a substantially purified prepolymer with ethylenically-unsaturated groups, reusable molds, and curing under a spatial limitation of actinic radiation (e.g., UV), as described in U.S. Pat. Nos. 5,508,317, 5,583,463, 5,789,464, and 5,849,810.

However, there are some practical limitations which hinder realization of all of the great potentials of such technology in the production of silicone hydrogel contact lenses. For example, when a silicone-containing prepolymer disclosed in commonly-owned U.S. Pat. Nos. 7,091,283, 7,268,189 and 7,238,750 is used to prepare a silicone hydrogel lens formulation, an organic solvent is generally required to solubilize the prepolymer. When such lens formulation is used to produce silicone hydrogel according to the Lightstream Technology™, the cured lens in the mold after UV crosslinking is still swollen in the organic solvent before the solvent exchange to water. Such lens may not be able to survive the mold opening and de-molding process, because the cured lens is in the swollen state in the organic solvent and has an inadequate stiffness and toughness (e.g., too low). As such, the production yield may be low and the production cost could be higher due to low production yield derived from the lens defects created during mold opening and de-molding process. However, conventional release mold agents are not effective to reduce lens defects created during mold opening and de-molding process in manufacturing contact lenses from silicone-containing prepolymers. The defects created during mold separation cab be a big issue in manufacturing contact lenses with silicone-containing prepolymer according to the LIGHTSTREAM TECHNOLOGY™.

Therefore, there is a need for a method for using a new mold releasing agent for molding contact lenses. There is also a need for a method for using a new mold releasing agent for molding silicone hydrogel contact lenses. There is a further need for a process for cast-molding contact lenses with an enhanced quality and enhanced yield achieved by reducing mold separation force and lens-mold adhesion through using a new mold releasing agent for molding silicone-containing prepolymer contact lenses with LIGHTSTREAM TECHNOLOGY™.

SUMMARY OF THE INVENTION

The invention, in one aspect, provides a method for producing a contact lens with relatively high quality and with relatively high yield. The method comprises the steps of: (1) introducing a fluid composition into a mold for making a contact lens, wherein the fluid composition comprises a lens-forming material and a phospholipid, wherein the lens-forming material is crosslinkable and/or polymerizable by actinic radiation; (2) crosslinking/polymerizing the lens-forming material in the mold to form a lens having a polymer matrix; and (3) separating the mold, wherein the phospholipid is present in an amount sufficient to reduce an averaged mold separation force by at least about 40% in comparison with that without the phospholipid.

The invention, in another aspect, provides a method for producing a contact lens with relatively high quality and with relatively high yield. The method comprises the steps of: (1) providing a contact lens mold, (2) applying to at least a part of a molding surface of the mold a layer of phospholipid solution, (3) at least partially drying said layer, 4) introducing a fluid composition into a mold for making a contact lens, wherein the fluid composition comprises a lens-forming material, wherein the lens-forming material is crosslinkable and/or polymerizable by actinic radiation; (5) crosslinking/polymerizing the lens-forming material in the mold to form a lens having a polymer matrix; and (6) separating the mold, wherein the phospholipid are present in an amount sufficient in the solution to reduce an averaged mold separation force by at least about 40% in comparison with that without the phospholipid or derivatives thereof.

DETAILED DESCRIPTION OF THE PREFERRED EMBODIMENTS

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. The singular forms "a", "an" and "the" include plural aspects unless the context clearly dictates otherwise. Thus, for example, reference to a phospholipid includes a single phospholipid, as well as two or more phospholipids. The nomenclature used herein and the laboratory procedures described below are those well known and commonly employed in the art. As employed throughout the disclosure, the following terms, unless otherwise indicated, shall be understood to have the following meanings.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Hydrophilic," as used herein, describes a material or portion thereof that will more readily associate with water than with lipids.

A "monomer" means a low molecular weight compound that can be polymerized and comprises one or more actinically crosslinkable groups. Low molecular weight typically means average molecular weights less than 700 Daltons.

An "actinically-crosslinkable group" refers to a group which can react with another group of same type or different type to form a covalent linkage upon actinic irradiation. Examples of actinically-crosslinkable groups include without limitation acryl groups, thiol groups, and ene-containing groups. Acryl groups can undergo free-radical chain reaction upon actinic irradiation. Thiol groups (—SH) and ene-containing groups can participate in thiol-ene step-growth radical polymerization as described in a commonly-owned copending U.S. patent application No. 60/869,812 filed Dec. 13, 2006 (entitled "PRODUCTION OF OPHTHALMIC DEVICES BASED ON PHOTO-INDUCED STEP GROWTH POLYMERIZATION"), herein incorporated in reference in its entirety.

An "acryl group" is an organic radical having a formula of

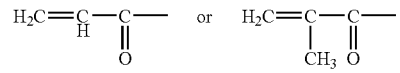

, provided the carbonyl is connected to O or N.

A "ene-containing group" is a mono-valent or divalent radical contains a carbon-carbon double which is not directly linked to a carbonyl group (—CO—), nitrogen atom, or oxygen atom and is defined by any one of formula (I)-(III)

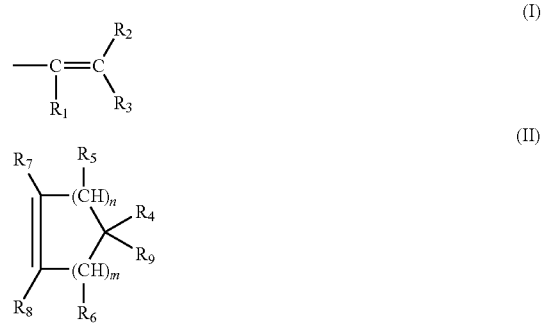

-continued

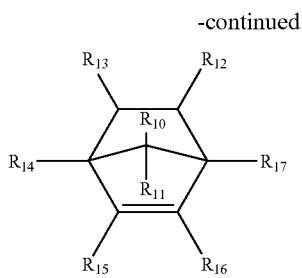
(III)

in which $R_1$ is hydrogen, or $C_1$-$C_{10}$ alkyl; $R_2$ and $R_3$ independent of each other are hydrogen, $C_1$-$C_{10}$ alkene divalent radical, $C_1$-$C_{10}$ alkyl, or —$(R_{18})_a$—$(X_1)_b$—$R_{19}$ in which $R_{18}$ is $C_1$-$C_{10}$ alkene divalent radical, $X_1$ is an ether linkage (—O—), a urethane linkage (—N), a urea linkage, an ester linkage, an amid linkage, or carbonyl, $R_{19}$ is hydrogen, a single bond, amino group, carboxylic group, hydroxyl group, carbonyl group, $C_1$-$C_{12}$ aminoalkyl group, $C_1$-$C_{18}$ alkylaminoalkyl group, $C_1$-$C_{18}$ carboxyalkyl group, $C_1$-$C_{18}$ hydroxyalkyl group, $C_1$-$C_{18}$ alkylalkoxy group, $C_1$-$C_{12}$ aminoalkoxy group, $C_1$-$C_{18}$ alkylaminoalkoxy group, $C_1$-$C_{18}$ carboxyalkoxy group, or $C_1$-$C_{18}$ hydroxyalkoxy group, a and b independent of each other is zero or 1, provided that only one of $R_2$ and $R_3$ is a divalent radical; $R_4$-$R_9$, independent of each other, are hydrogen, $C_1$-$C_{10}$ alkene divalent radical, $C_1$-$C_{10}$ alkyl, or —$(R_{18})_a$—$(X_1)_b$—$R_{19}$, provided that only one or two of $R_4$-$R_9$ are divalent radicals; n and m independent of each other are integer number from 0 to 9, provided that the sum of n and m is an integer number from 2 to 9; $R_{10}$-$R_{17}$, independent of each other, are hydrogen, $C_1$-$C_{10}$ alkene divalent radical, $C_1$-$C_{10}$ alkyl, or —$(R_{18})_a$—$(X_1)_b$—$R_{19}$, provided that only one or two of $R_{10}$-$R_{17}$ are divalent radicals.

A "vinylic monomer", as used herein, refers to a monomer that has an ethylenically unsaturated group and can be polymerized actinically or thermally.

The term "olefinically unsaturated group" or "ethylenically unsaturated group" is employed herein in a broad sense and is intended to encompass any groups containing a >C═C< group. Exemplary ethylenically unsaturated groups include without limitation acryloyl, methacryloyl, allyl, vinyl, styrenyl, or other C═C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

A "hydrophilic monomer" refers to a monomer which can be polymerized to form a polymer that is water-soluble or can absorb at least 10 percent by weight of water.

A "hydrophobic monomer", as used herein, refers to a monomer which is polymerized to form a polymer that is insoluble in water and can absorb less than 10 percent by weight water.

A "macromer" refers to a medium and high molecular weight compound which can be polymerized and/or crosslinked and comprise one or more actinically-crosslinkable groups. Medium and high molecular weight typically means average molecular weights greater than 700 Daltons.

A "prepolymer" refers to a starting polymer which contains actinically crosslinkable groups and can be cured (e.g., crosslinked) actinically to obtain a crosslinked polymer having a molecular weight much higher than the starting polymer.

A "silicone-containing prepolymer" refers to a prepolymer which contains silicone and can be crosslinked actinically to obtain a crosslinked polymer having a molecular weight much higher than the starting polymer.

"Molecular weight" of a polymeric material (including monomeric or macromeric materials), as used herein, refers to the number-average molecular weight unless otherwise specifically noted or unless testing conditions indicate otherwise.

"Polymer" means a material formed by polymerizing one or more monomers.

As used herein, the term "multiple" refers to three or more.

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, DAROCURE® types a non-yellowing highly efficient liquid photoinitiator used to initiate the photopolymerization of chemically unsaturated prepolymers—e.g. acrylates—in combination with mono- or multifunctional monomers, and IRGACURE® types a highly efficient non-yellowing radical photoinitiator for UV curing systems comprising of unsaturated monomers and prepolymers. It is especially suited where low odor is required and for use in water-borne systems based on acrylate or unsaturated polyester resins. The active hydroxy group can be reacted with suitable functionalized unsaturated resins, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is 2,2'-azobis(isobutyronitrile) (AIBN).

A "spatial limitation of actinic radiation" refers to an act or process in which energy radiation in the form of rays is directed by means of, for example, a mask or screen or combinations thereof, to impinge, in a spatially restricted manner, onto an area having a well defined peripheral boundary. For example, a spatial limitation of UV radiation can be achieved by using a mask or screen which has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the masked region.

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

"Dye" means a substance that is soluble in a solvent and that is used to impart color. Dyes are typically translucent and absorb but do not scatter light. Any suitable biocompatible dye can be used in the present invention.

A "Pigment" means a powdered substance that is suspended in a liquid in which it is insoluble. A pigment can be a fluorescent pigment, phosphorescent pigment, pearlescent pigment, or conventional pigment. While any suitable pigment may be employed, it is presently preferred that the pigment be heat resistant, non-toxic and insoluble in aqueous solutions.

The term "fluid" as used herein indicates that a material is capable of flowing like a liquid.

"Surface modification", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929 and 6,822,016 (herein incorporated by references in their entireties), reinforced mold-transfer coating disclosed in U.S. Patent Application Ser. No. 60/811,949 (herein incorporated by reference in its entirety), and layer-by-layer coating ("LbL coating") obtained according to methods described in U.S. Pat. Nos. 6,451,871, 6,719,929, 6,793,973, 6,811,805, 6,896,926 (herein incorporated by references in their entirety).

An "antimicrobial agent", as used herein, refers to a chemical that is capable of decreasing or eliminating or inhibiting the growth of microorganisms such as that term is known in the art.

"Antimicrobial metal nanoparticles" refer to particles which are made essentially of an antimicrobial metal and have a size of less than 1 micrometer. The antimicrobial metal in the antimicrobial metal nanoparticles can be present in one or more of its oxidation states. For example, silver-containing nanoparticles can contain silver in one or more of its oxidation states, such as $Ag^0$, $Ag^{1+}$, and $Ag^{2+}$.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3\ oxygen)/(cm^2)(sec)(mm^2\ Hg)] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3\ oxygen)(mm)/(cm^2)(sec)(mm^2\ Hg)] \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm $$\left(\frac{90 \times 10^{-10}}{0.09} = 100 \times 10^{-9}\right)$$

(oxygen transmissibility barrers/mm). In accordance with the invention, a high oxygen permeability in reference to a material or a contact lens characterized by apparent oxygen permeability of at least 40 barrers or larger measured with a sample (film or lens) of 100 microns in thickness according to a coulometric method described in Examples.

The "ion permeability" through a lens correlates with both the Ionoflux Diffusion Coefficient and the Ionoton Ion Permeability Coefficient.

The Ionoflux Diffusion Coefficient, D, is determined by applying Fick's law as follows:

$$D = -n'/(A \times dc/dx)$$

where n'=rate of ion transport [mol/min]
A=area of lens exposed [mm$^2$]
D=Ionoflux Diffusion Coefficient [mm$^2$/min]
dc=concentration difference [mol/L]
dx=thickness of lens [mm]

The Ionoton Ion Permeability Coefficient, P, is then determined in accordance with the following equation:

$$\ln(1 - 2C(t)/C(0)) = -2APt/Vd$$

where: C(t)=concentration of sodium ions at time t in the receiving cell
C(0)=initial concentration of sodium ions in donor cell
A=membrane area, i.e., lens area exposed to cells
V=volume of cell compartment (3.0 ml)
d=average lens thickness in the area exposed
P=permeability coefficient An Ionoflux Diffusion Coefficient, D, of greater than about $1.5 \times 10^{-6}$ mm$^2$/min is preferred, while greater than about $2.6 \times 10^{-6}$ mm$^2$/min is more preferred and greater than about $6.4 \times 10^{-6}$ mm$^2$/min is most preferred.

It is known that on-eye movement of the lens is required to ensure good tear exchange, and ultimately, to ensure good corneal health. Ion permeability is one of the predictors of on-eye movement, because the permeability of ions is believed to be directly proportional to the permeability of water.

The term "mold separation force" as used herein refers to a force required for separating a mold after casting molding a contact lens in the mold. Mold separation force is proportional to adhesion between a mold and a lens cast-molded therein.

An "averaged mold separation force" refers to a value obtained by averaging at least 10 independent measurements of mold separation force (i.e., 10 testing samples).

In general, the invention is directed to a method for reducing adhesion between a mold (or mold half and a contact lens cast-molded in the mold. The method of the invention relies on a phospholipid as an internal mold releasing agent in a lens-forming formulation (composition). The method of the invention can also rely on a phospholipid as an external mold releasing agent to coat the phospholipid solution onto a mold surface. A phospholipid of the invention is selected to reduce an averaged mold separation force by at least about 40% in comparison with that without the phospholipids.

The invention is partly based on the discovery that, a phospholipid, such as, e.g., phosphatidyl choline or a PEG-ylated phosphatidyl ethanolamine, can be used as an efficient mold releasing agent in a lens-forming composition including an actinically crosslinkable silicone containing prepolymer as a lens-forming material. The invention is also based on the discovery that, a phospholipid, such as, e.g., phosphatidyl choline or a PEG-ylated phosphatidyl ethanolamine, can be used as an efficient mold releasing agent in a lens-forming composition including an actinically crosslinkable silicone containing prepolymer as a lens-forming material, when a reusable mold is used to make the lenses, wherein the reusable mold is made from materials such as glass, PMMA, quartz, TOPAS® or $CaF_2$. This advantage to reduce adhesion force of silicone hydrogel contact lenses to that reusable mold enhances quality and improves production yield. The invention is still further based on the discovery that, a phospholipid, such as, e.g., phosphatidyl choline or a PEG-ylated phosphatidyl ethanolamine, not only able to reduce the mold adhesion force but also able to render the surface of the silicone hydrogel contact lens more hydrophilic, i.e. make them water wettable. Sufficient wetting by water or water based liquids is often a prerequisite for the utilization of the silicone hydrogel contact lenses. Additional process steps are usually necessary in order to render the contact lenses hydrophilic. By the use of phosphatidyl choline and/or a PEG-ylated phosphatidyl ethanolamine such additional process steps could be reduced or eliminated.

Although the inventors do not wish to be bound by any particular theory, it is believed that reduction of mold separation force by the presence of a mold releasing agent is due to a phospholipid can migrate through a lens-forming composition including an actinically crosslinkable silicone containing prepolymer having hydrophilic segments to the interface between a mold and a lens-forming composition therein. Phospholipids can form monolayers or bilayers at the mold surface unlike the conventional mold releasing agents. The differences are probably due to the unique structure and physical and chemical properties of the phospholipids.

The invention, in one aspect, provides a method for producing a contact lens with relatively high quality and with relatively high yield. The method comprises the steps of: (1) introducing a fluid composition into a mold for making a contact lens, wherein the fluid composition comprises a lens-forming material and a phospholipid, wherein the lens-forming material is crosslinkable and/or polymerizable by actinic radiation; (2) crosslinking/polymerizing the lens-forming material in the mold to form a lens having a polymer matrix; and (3) separating the mold, wherein the phospholipid is present in an amount sufficient to reduce an averaged mold separation force by at least about 40% in comparison with that without the phospholipids.

The invention, in another aspect, provides a method for producing a contact lens with relatively high quality and with relatively high yield. The method comprises the steps of: (1) providing a contact lens mold, (2) applying to at least a part of a molding surface of the mold a layer of phospholipid solution, (3) at least partially drying said layer, 4) introducing a fluid composition into a mold for making a contact lens, wherein the fluid composition comprises a lens-forming material, wherein the lens-forming material is crosslinkable and/or polymerizable by actinic radiation; (5) crosslinking/polymerizing the lens-forming material in the mold to form a lens having a polymer matrix; and (6) separating the mold, wherein the phospholipid or derivatives thereof is present in an amount sufficient in the solution to reduce an averaged mold separation force by at least about 40% in comparison with that without the phospholipids.

In accordance with the invention, an increased production yield is intended to describe that the yield of contact lens production is increased by adding a mold releasing agent in a lens-forming composition. An "improved lens quality" is intended to describe that the quality of produced contact lenses is improved in the presence of a mold releasing agent in a lens-forming composition as compared to that in the absence of the mold releasing agent.

In a preferred embodiment, the phospholipids is present in an amount sufficient to reduce disparity of mold separation force.

In accordance with the present invention, a fluid composition is a solution or a solvent-free liquid or melt at a temperature below about 80° C. A fluid composition can optionally further include various components, such as photoinitiator, visibility tinting agent, fillers, and the like. A fluid composition of the invention can further include other components, such as a photoinitiator, a visibility tinting agent, a filler, a antimicrobial agent, a lubricant, a UV-blocking agent, a photosensitizer, or a mixture thereof.

Any lens-forming materials can be used in the invention. Lens forming materials that are suitable in the fabrication of contact lenses are illustrated by numerous issued US patents and familiar to those skilled in the art. Preferred lens-forming materials are capable of forming hydrogels. A lens-forming material can be a prepolymer, a mixture of prepolymers, a mixture of monomers, or a mixture of one or more prepolymers and one or more monomers and/or macromers. It should be understood that any silicone-containing prepolymers or any silicone-free prepolymers can be used in the present invention.

A solution of a lens-forming material can be prepared by dissolving the lens-forming material in any suitable solvent known to a person skilled in the art. Examples of suitable solvents are water, alcohols, such as lower alkanols (e.g., ethanol, methanol or isopropanol), carboxylic acid amides (e.g., dimethylformamide), dipolar aprotic solvents, such as dimethyl sulfoxide or methyl ethyl ketone, ketones (e.g., acetone or cyclohexanone), hydrocarbons (e.g., toluene, ethers, THF, dimethoxyethane or dioxane), and halogenated hydrocarbons (e.g., trichloroethane), and mixtures of suitable solvents (e.g., mixtures of water with an alcohol, a water/ethanol or a water/methanol mixture).

Polymerizable materials (or silicone hydrogel lens-forming materials) for making contact lenses are well known to a person skilled in the art. A polymerizable material can comprise at least one silicon-containing prepolymer, monomer, macromer or combination thereof. In accordance with the invention, the polymerizable material comprises at least one silicone-containing prepolymer. The silicone prepolymer comprises actinically crosslinkable groups, preferably at least three actinically crosslinkable groups selected from the group consisting of acryl groups, thiol groups, ene-containing groups, and combination thereof.

Where crosslinking of a prepolymer of the invention is based on the mechanism of free radical chain-growth polymerization, the prepolymer comprises at least two acryl groups, preferably at least three acryl groups.

Where crosslinking of a prepolymer of the invention is based on the mechanism of thiol-ene step-growth radical polymerization, the actinically crosslinkable groups of the prepolymer preferably comprises at least three thiol groups or at least three ene-containing groups.

Where the prepolymer comprises multiple ene-containing groups, these groups undergo thiol-ene step-growth radical polymerization in the presence of thiol groups which can be provided by a step-growth-crosslinking agent having two or more thiol groups. Similarly, where the prepolymer comprises multiple thiol groups, these groups undergo thiol-ene step-growth radical polymerization in the presence of ene-containing groups which can be provided by a step-growth-crosslinking agent having two or more ene-containing groups.

Any suitable actinically-crosslinkable silicone-containing prepolymer can be used in the invention. Preferably, a silicone-containing prepolymer comprises hydrophilic segments and hydrohphobic segments. Examples of silicone-containing prepolymers are those described in commonly-owned U.S. Pat. Nos. 6,039,913, 7,091,283, 7,268,189 and 7,238,750, and U.S. patent application Ser. No. 09/525,158 filed Mar. 14, 2000 (entitled "Organic Compound"), Ser. Nos. 11/825,961, 60/869,812 filed Dec. 13, 2006 (entitled "Production of Ophthalmic Devices Based on Photo-Induced Step Growth Polymerization", 60/869,817 filed Dec. 13, 2006 (entitled "Actinically Curable Silicone Hydrogel Copolymers and Uses thereof"), 60/896,325 filed Mar. 22, 2007 ("Prepolymers with Dangling Polysiloxane-Containing Polymer Chains"), 60/896,326 filed Mar. 22, 2007 ("Silicone-Containing Prepolymers with Dangling Hydrophilic Polymeric Chains"), U.S. 2008/0015315 ("Novel Polymer") and U.S. 2008/0152800 ("Process for the Coating of Biomedical Articles") which are incorporated herein by references in their entireties.

A silicone-containing prepolymer of the invention is capable of forming, preferably in the absence of any hydrophilic vinylic monomer, a silicone hydrogel or contact lens, which has a high oxygen permeability (characterized by an apparent oxygen permeability of at least 40 barrers, preferably at least about 60 barrers, even more preferably at least 80 barrers) and a hydrophilic surface (characterized by having an averaged water contact angle of less than about about 90 degrees or less, preferably about 80 degrees or less, more preferably about 70 degrees or less, even more preferably about 60 degrees or less). The silicone hydrogel material or contact lens preferably has a high ion permeability (characterized by an Ionoflux Diffusion Coefficient, D, of greater than about $1.5 \times 10^{-6}$ mm$^2$/min, preferably greater than about $2.6 \times 10^{-6}$ mm$^2$/m in, more preferably greater than about $6.4 \times 10^{-6}$ mm$^2$/min). The silicone hydrogel material or contact lens preferably has an elastic modulus of from about 0.2 MPa to about 2.0 MPa, preferably from about 0.3 MPa to about 1.5 MPa, more preferably from about 0.4 MPa to about 1.2 MPa. The silicone hydrogel material or contact lens preferably has a water content of preferably from about 15% to about 80%, more preferably from about 20% to about 65% by weight when fully hydrated. The water content of a silicone hydrogel contact lens can be measured according to Bulk Technique as disclosed in U.S. Pat. No. 5,849,811.

Preferably, the prepolymers used in the invention are previously purified in any known manner, for example, by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated solutions that are free, or at least substantially free, from reaction products, such as salts, and from starting materials. The preferred purification process for the prepolymers used in the process according to the invention, ultrafiltration, can be carried out in a manner known to a person skilled in the art. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner. Thus, after polymerization, the device will not require subsequent purification such as, for example, costly and complicated extraction of unpolymerized matrix-forming material. Furthermore, crosslinking of the prepolymer can take place absent a solvent or in aqueous solution so that a subsequent solvent exchange or the hydration step is not necessary.

Any monomers suitable for making contact lenses can be used in the invention. Preferably, vinylic monomers are used in the invention.

Examples of silicone-containing vinylic monomers include, without limitation, methacryloxyalkylsiloxanes, 3-methacryloxy propylpentamethyldisiloxane, bis(methacryloxypropyl)tetramethyl-disiloxane, monomethacrylated polydimethylsiloxane, mercapto-terminated polydimethylsiloxane, N-[tris(trimethylsiloxy)silylpropyl]acrylamide, N-[tris(trimethylsiloxy)silylpropyl]methacrylamide, tris (pentamethyldisiloxyanyl)-3-methacrylatopropylsilane (T2), and tristrimethylsilyloxysilylpropyl methacrylate (TRIS). A preferred siloxane-containing monomer is TRIS, which is referred to 3-methacryloxypropyltris(trimethylsiloxy)silane, and represented by CAS No. 17096-07-0. The term "TRIS" also includes dimers of 3-methacryloxypropyltris(trimethylsiloxy)silane.

Any suitable siloxane-containing macromer with ethylenically unsaturated group(s) can be used to produce a silicone hydrogel material. A particularly preferred siloxane-containing macromer is selected from the group consisting of Macromer A, Macromer B, Macromer C, and Macromer D described in U.S. Pat. No. 5,760,100, herein incorporated by reference in its entirety. Macromers that contain two or more polymerizable groups (vinylic groups) can also serve as cross linkers. Di and triblock macromers consisting of polydimethylsiloxane and polyakyleneoxides could also be of utility. Such macromers could be mono or difunctionalized with acrylate, methacrylate or vinyl groups. For example one might use methacrylate end capped polyethyleneoxide-block-polydimethylsiloxane-block-polyethyleneoxide to enhance oxygen permeability.

In accordance with the present invention, a polymerizable material can also comprise a hydrophilic vinylic monomer. Nearly any hydrophilic vinylic monomer that can act as a plasticizer can be used in the fluid composition of the invention. Among the preferred hydrophilic monomers are N,N-dimethylacrylamide (DMA), 2-hydroxyethylmethacrylate (HEMA), hydroxyethyl acrylate, hydroxypropyl acrylate, hydroxypropyl methacrylate (HPMA), trimethylammonium 2-hydroxy propylmethacrylate hydrochloride, dimethylaminoethyl methacrylate (DMAEMA), dimethylaminoethyl-methacrylamide, acrylamide, methacrylamide, allyl alcohol, vinylpyridine, glycerol methacrylate, N-(1,1dimethyl-3-oxobutyl)acrylamide, N-vinyl-2-pyrrolidone (NVP), acrylic acid, methacrylic acid, and N,N-dimethyacrylamide (DMA).

A polymerizable material can also comprises a hydrophobic monomer. By incorporating a certain amount of hydrophobic vinylic monomer in a polymerizable fluid composition, the mechanical properties (e.g., modulus of elasticity) of the resultant polymer may be improved.

Examples of water-soluble actinically crosslinkable prepolymers include, but are not limited to, a water-soluble crosslinkable polyurea prepolymer described in U.S. Pat. No. 6,479,587 or in U.S. Patent Application publication No. 2005/0113549 A1 (herein incorporated by reference in their entireties); a water-soluble crosslinkable poly(vinyl alcohol) prepolymer described in U.S. Pat. Nos. 5,583,163 and 6,303,687 (incorporated by reference in their entireties); a water-soluble crosslinkable poly(oxyalkylene)-containing polyurethane prepolymer disclosed in U.S. patent application publication No. 2004/0082680 A1 (herein incorporated by reference); a water-soluble crosslinkable poly(oxyalkylene)-containing polyamide prepolymer disclosed in a copending U.S. Patent Application Ser. No. 60/630,164 filed Nov. 22, 2004 entitled "Crosslinkable Poly(oxyalkylene)-Containing Polyamide Prepolymers" (herein incorporated by reference in its entirety); derivatives of a polyvinyl alcohol, polyethyleneimine or polyvinylamine, which are disclosed in U.S. Pat. No. 5,849,841 (incorporated by reference in its entirety); crosslinkable polyacrylamide; crosslinkable statistical copolymers of vinyl lactam, MMA and a comonomer, which are disclosed in EP 655,470 and U.S. Pat. No. 5,712,356; crosslinkable copolymers of vinyl lactam, vinyl acetate and vinyl alcohol, which are disclosed in EP 712,867 and U.S. Pat. No. 5,665,840; polyether-polyester copolymers with crosslinkable side chains which are disclosed in EP 932,635 and U.S. Pat. No. 6,492,478; branched polyalkylene glycol-urethane prepolymers disclosed in EP 958,315 and U.S. Pat. No. 6,165,408; polyalkylene glycol-tetra(meth)acrylate prepolymers disclosed in EP 961,941 and U.S. Pat. No. 6,221,303; and crosslinkable polyallylamine gluconolactone prepolymers disclosed in PCT patent application WO 2000/31150 and U.S. Pat. No. 6,472,489.

The polymerizable material can optionally but preferably does not comprise one or more monomer and/or one or more crosslinking agents (i.e., compounds with two or more vinylic groups or three or more thiol or ene-containing groups and with molecular weight less than 700 Daltons). However, the amount of those components should be low such that the final ophthalmic device does not contain unacceptable levels of unpolymerized monomers and/or crosslinking agents. The presence of unacceptable levels of unpolymerized monomers and/or crosslinking agents will require extraction to remove them, which requires additional steps that are costly and inefficient. But preferably, the polymerizable material is substantially free of monomer and crosslinking agent (i.e., preferably about 2% or less, more preferably about 1% or less, even more preferably about 0.5% or less by weight of combination of monomer and crosslinking agent).

It must be understood that a fluid composition can also comprise various components, such as, for example, polymerization initiators (e.g., photoinitiator or thermal initiator), a visibility tinting agent (e.g., dyes, pigments, or mixtures thereof), UV-blocking (absorbing) agent, photosensitizers, inhibitors, antimicrobial agents (e.g., preferably silver nanoparticles or stabilized silver nanoparticles), bioactive agent, leachable lubricants, fillers, and the like, as known to a person skilled in the art.

A fluid composition preferably further comprise an antimicrobial agent, preferably antimicrobial metal nanoparticles, more preferably silver nanoparticles. These antimicrobial agents should be incorporated in resultant contact lenses so as to impart the resultant contact lenses antimicrobial properties.

A fluid composition preferably further comprises a leachable wetting agent which can be incorporated in resultant contact lenses. A "leachable wetting agent" is intended to describe a wetting material that is not covalently attached to the polymer matrix of a resultant contact lens but instead is physically entrapped in the polymer matrix of the resultant lens.

Any non-crosslinkable hydrophilic polymers can be used as leachable wetting agent in the invention. Exemplary non-crosslinkable hydrophilic polymers include, but are not limited to, polyvinylalcohols (PVAs), polyethylene oxide, polyethylene-polypropylene block copolymers, polyamides, polyimides, polylactone, a homopolymer of a vinyl lactam of formula (I) shown above, a copolymer of at least one vinyl lactam of formula (I) shown above in the presence or in the absence of one or more hydrophilic vinylic comonomers, a homopolymer of acrylamide or methaacrylamide, a copolymer of acrylamide or methacrylamide with one or more hydrophilic vinylic monomers, mixtures thereof.

The number-average molecular weight $M_n$ of the non-crosslinkable hydrophilic polymer is preferably from 20,000 to 500,000, more preferably from 30,000 to 100,000, even more preferably from 35,000 to 70,000.

Initiators, for example, selected from materials well known for such use in the polymerization art, may be included in the lens-forming material in order to promote, and/or increase the rate of, the polymerization reaction. An initiator is a chemical agent capable of initiating polymerization reactions. The initiator can be a photoinitiator or a thermal initiator.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers Examples of suitable thermal initiators include, but are not limited to, 2,2'-azobis(2,4-dimethylpentanenitrile), 2,2'-azobis (2-methylpropanenitrile), 2,2'-azobis(2-methylbutanenitrile), peroxides such as benzoyl peroxide, and the like. Preferably, the thermal initiator is azobisisobutyronite (AIBN).

Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl /acids (e.g., glycolic, lactic, malic, tartaric, mandelic and citric acids and salts thereof, etc.), linoleic and gamma linoleic acids, and vitamins (e.g., B5, A, B6, etc.).

A fluid composition of the invention can be prepared by dissolving at least one silicone-containing prepolymer and other components in a solvent or a mixture of solvents.

Any suitable organic solvent can be used in the invention so long as it can dissolve the polymerizable material to form a solution. Example of organic solvents includes without limitation tetrahydrofuran, tripropylene glycol methyl ether, dipropylene glycol methyl ether, ethylene glycol n-butyl ether, diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

In a preferred embodiment, the organic solvent is a $C_1$-$C_3$ alkanol, preferably propanol or isopropanol). Preferably, the solvent mixture comprises a second organic solvent which is a $C_4$-$C_{18}$ alkanol.

The fluid composition can be introduced (dispensed) into a cavity formed by a mold according to any known methods.

In accordance with the invention, any phospholipid can be used in the invention, so long it can reduce average mold separation force. Phospholipids are a class of lipids, and a major component of all biological membranes biological membranes, along with glycolipids, cholesterol and proteins. In its simplest form, a phospholipid is composed of one glycerol bonded to one or two fatty acids and one phosphate group. A phospholipids have amphipathic character. The head (the polar phosphate group) is hydrophilic; the tails (the two fatty acids) are hydrophobic. When placed in water, a phospholipid form one of a number of lipid phases. In biological systems this is restricted to bilayers, in which the lipophilic tails line up against one another, forming a membrane with hydrophilic heads on both sides facing the water. This allows it to form liposomes spontaneously, or small lipid vesicles.

A phospholipid may be any natural or synthetic phospholipid, for example, but are not limited to, phosphatidylcholines (PC), such as egg yolk phosphatidylcholine, hydrogenated egg yolk phosphatidylcholine, soybean phosphatidylcholine, hydrogenated soybean phosphatidylcholine, dilauroyl phosphatidylcholine, dimyristoyl phosphatidylcholine, dioleoyl phosphatidylcholine, dipalmitoyl phosphatidylcholine, and distearoyl phosphatidylcholine; phosphatidylethanolamines (PE), such as egg yolk phosphatidylethanolamine, soybean phosphatidylethanolamine, dilauroyl phosphatidylethanolamine, dimyristoyl phosphatidylethanolamine, dioleoyl phosphatidylethanolamine, dipalmitoyl phosphatidylethanolamine, and distearoyl phosphatidylethanolamine; phosphatidylglycerols (PG), such as egg yolk phosphatidylglycerol, dilauroyl phosphatidylglycerol, dimyristoyl phosphatidylglycerol, dioleoyl phosphatidylglycerol, dipalnitoyl phosphatidylglycerol, and distearoyl phosphatidylglycerol; phosphatidylinositols (PI), such as hydrogenated egg yolk phosphatidylinositol, soybean phosphatidylinositol, dilauroyl phosphatidylinositol, dimyristoyl phosphatidylinositol, dioleoyl phosphatidylinositol, dipalmitoyl phosphatidylinositol, and distearoyl phosphatidylinositol; phosphatidylserines (PS), such as dilauroyl phosphatidylserine, dimyristoyl phosphatidylserine, dioleoyl phosphatidylserine, dipalmitoyl phosphatidylserine, and distearoyl phosphatidylserine; phosphatidic acids (PA), such as dilauroyl phosphatidic acid, dimyristoyl phosphatidic acid, dioleoyl phosphatidic acid, dipalmitoyl phosphatidic acid, and distearoyl phosphatidic acid; cardiolipins, such as tetralauroyl cardiolipin, tetramyristoyl cardiolipin, tetraoleoyl cardiolipin, tetrapalmitoyl cardiolipin, and tetrastearoyl cardiolipin; sphingomyelins; and phosphatidyl-choline, serine, inositol, ethanolamine lipid derivatives such as egg phosphatidylcholine (EPC), dilauroylphosphatidylethanolamine, dimyristoylphosphatidylethanolamine, dipalmitoyl-phosphatidylethanolamine, distearoylphosphatidylethanolamine, dioleoyl-phosphatidylethanolamine, distearoyl-phosphatidylserine, dilinoleoyl phosphatidylinositol, and mixtures thereof.

The preferred phospholipids are PEG-ylated phosphatidyl ethanolamines and phosphatidylcholine (PC). Phosphatidylcholine (PC) can be classified into saturated and unsaturated phosphatidylcholine as shown by the general Formula 1:

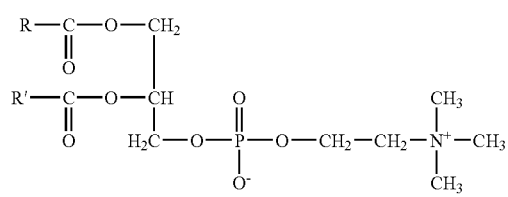

wherein R and R' may be the same or different and each is a fatty acid chain. When both R and R' are saturated fatty acid chains, it is called saturated phosphatidylcholines (SPC). Dipalmiphatidylcholine (DPPC) contains two saturated fatty acids chains and is a SPC. When at least one of or both of R and R' are unsaturated fatty acid chains, it is called unsaturated phosphatidylcholines (USPC).

Examples of USPC are palmitoyl-oleoyl-phosphatidylcholine (POPC), palmitoyl-linoleoyl-phosphatidylcholine (PLPC), dilioleoyl-phosphatidylcholine (DLPC), dioleoyl-phosphatidylcholine (DOPC), stearoyl-linoleoyl-phosphatidylcholine (SLPC), and stearoyl-araidonoyl-phosphatidylcholine (SAPC).

PEG-ylated phosphatidyl ethanolamines, poly(ethylene glycol (PEG)-modified phosphatidyl ethanolamines (PEs), are amphipathic lipid-containing conjugates which include conjugates of phosphatidylethanolamines ("PEs") and Polyethylene glycol (PEG). Examples of phosphatidylethanolamines ("PEs") include dipalmitoyl phosphatidylethanolamine ("DPPE"), palmitoyloleoyl phosphatidylethanolamine ("POPE"), dioleoyl phosphatidylethanolamine ("DOPE") or distearoyl phosphatidylethanolamine ("DSPE"). The prefer phosphatidylethanolamine is distearoyl phosphatidylethanolamine ("DSPE"). A PEG or polyoxyethylene having a molecular weight of from about 50 to about 5000, and preferable PEG having a molecular weight of about 1000 to about 5000. A PEG or polyoxyethylene having a molecular weight of 1000 is identified as PEG(1000). The preferable PEGylated phosphatidyl ethanolamines are DSPE-PEG(1000), DSPE-PEG(2000), DSPE-PEG(3000), DSPE-PEG(4000), or DSPE-PEG(5000). Examples of PEG-ylated phosphatidyl ethanolamines are N-(Carboxy-methoxypolyethylenglycol-5000)-1,2-distearoyl-sn-glycero-3-phospoethanolamine, sodium salt) and N-(Carboxy-methoxypolyethylenglycol-2000)-1,2-distearoyl-sn-glycero-3-phospoethanolamine, sodium salt ) and N-(Carboxy-methoxypolyethylenglycol-1000)-1,2-distearoyl-sn-glycero-3-phospoethanolamine, ammonium salt ) from AVANTI POLAR LIPIDS, Inc. (USA).

The phospholipid is present in the fluid composition in an amount sufficient to reduce an averaged mold separation force by at least about 40%, preferably by at least about 50%, more preferably by at least about 60%, in comparison with that without the phospholipid (i.e., compared with the averaged mold separation force obtained when replacing the fluid composition with a control composition). The control composition comprises all components except the phospholipid of the fluid composition (i.e., free of the phospholipid).

In accordance with the invention, the averaged mold separation force is reduced to preferably about 35 N or less, more preferably about 30 N or less, even more preferably about 25 N or less.

In accordance with the invention, the phospholipid can be used as an internal mold release agent. In this embodiment, the phospholipid can present in the fluid composition in an amount of up to 10% by weight, preferably up to 5% by weight, more preferably from 0.1% to 5% by weight, even more preferably from 0.5% to 4% by weight and in particular from 1% to 2% by weight, each based on the entire weight of the fluid composition.

In accordance with the invention, the phospholipid can also be used as a external mold release agent. In this embodiment, the phospholipid can be dissolved in any suitable solvent known to a person skilled in the art before being applied to the mold surface. Then, the mold surface cab be at least partially dried. Examples of suitable solvents are water, alcohols, such as lower alkanols (e.g., ethanol, methanol or isopropanol), carboxylic acid amides (e.g., dimethylformamide), dipolar aprotic solvents, such as dimethyl sulfoxide or methyl ethyl ketone, ketones (e.g., acetone or cyclohexanone), hydrocarbons (e.g., toluene, ethers, THF, dimethoxyethane or dioxane), and halogenated hydrocarbons (e.g., trichloroethane), and mixtures of suitable solvents (e.g., mixtures of water with an alcohol, a water/ethanol or a water/methanol mixture). The solution comprises, based on the entire weight of the solution, 0.01% to 50%, preferably 0.1 to 10%, and more preferably 1 to 20% and in particular 5 to 15% of the phospholipid. The solution of the phospholipid may be applied to the mold surface by any known method, for example, by spraying, swabbing, dipping or stamping such that the surface is evenly coated therewith. Spraying using a spray nozzle is preferred. The time required for steps applying phospholipid solution to the mold surface and at least partially drying is not critical as such. However, it has to be pointed out that even with very short cycle times, for example, less than 10 seconds, used in today's contact lens production, particularly favorable results may be been obtained.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Preferable mold materials are those allow UV light transmission and could be used to make reusable molds, such as quartz, glass, CaF2, PMMA and sapphire.

A person skilled in the art will know well how to actinically or thermally crosslink and/or polymerize (i.e., cure) the lens-forming material within the lens-forming cavity to form the contact lens.

In a preferred embodiment, where a fluid composition is a solution, solvent-free liquid, or melt of one or more prepolymers optionally in presence of other components, reusable molds are used and the lens-forming material is cured actinically under a spatial limitation of actinic radiation to form a contact lens. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

In this case, a fluid composition is put into a mold consisting of two mold halves, the two mold halves not touching each other but having a thin gap of annular design arranged between them. The gap is connected to the mold cavity, so that excess lens material can flow away into the gap. Instead of polypropylene molds that can be used only once, it is possible for reusable quartz, glass, sapphire molds to be used, since, following the production of a lens, these molds can be cleaned rapidly and effectively off the uncrosslinked prepolymer and other residues, using water or a suitable solvent, and can be dried with air. Reusable molds can also be made of Topas® COC grade 8007-S10 (clear amorphous copolymer of ethylene and norbornene) from Ticona GmbH of Frankfurt, Germany and Summit, N.J. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced.

The two opposite surfaces (anterior surface and posterior surface) of a contact lens are defined by the two molding surfaces while the edge is defined by the spatial limitation of actinic irradiation rather than by means of mold walls. Typically, only the lens-forming material within a region bound by the two molding surfaces and the projection of the well defined peripheral boundary of the spatial limitation is crosslinked whereas any lens-forming material outside of and immediately around the peripheral boundary of the spatial limitation is not crosslinked, and thereby the edge of the contact lens should be smooth and precise duplication of the dimension and geometry of the spatial limitation of actinic radiation. Such method of making contact lenses are described in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

A spatial limitation of actinic radiation (or the spatial restriction of energy impingement) can be effected by masking for a mold that is at least partially impermeable to the particular form of energy used, as illustrated in U.S. patent application Ser. No. 08/274,942 filed Jul. 14, 1994 and U.S. Pat. No. 6,627,124 (herein incorporated by reference in their entireties) or by a mold that is highly permeable, at least at one side, to the energy form causing the crosslinking and that has mold parts being impermeable or of poor permeability to the energy, as illustrated in U.S. patent application Ser. No. 10/732,566 filed Dec. 10, 2003, Ser. No. 10/721,913 filed Nov. 25, 2003 and U.S. Pat. No. 6,627,124 (herein incorporated by reference in their entireties). The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

A mold can be opened according to any suitable methods known to a person skilled in the art. A mold is separated into a male mold half and a female mold half, with the molded lens adhered to one of the two mold halves. After opening the mold, the lens is dislodged (removed) from its adhering mold half and can be subjected to one or more of the following known processes, extraction, surface treatment (e.g., plasma coating, LbL coating, corona treatment, etc.), hydration, equilibration, packaging, and sterilization (e.g., autoclave).

Preferred examples of prepolymers, phospholipids, monomers, fluid compositions, molds, and the amounts of the phospholipid are those described above.

The previous disclosure will enable one having ordinary skill in the art to practice the invention. In order to better enable the reader to understand specific embodiments and the advantages thereof, reference to the following examples is suggested.

EXPERIMENTS

Mold Release Agents:
DSPE-PEG(5000): N-(Carboxy-methoxypolyethylenglycol-5000)-1,2-distearoyl-sn-glycero-3-phospoethanolamine, sodium salt) (1a) available from AVANTI POLAR LIPIDS, Inc. (USA).
DSPE-PEG(2000): N-(Carboxy-methoxypolyethylenglycol-2000)-1,2-distearoyl-sn-glycero-3-phospoethanolamine, sodium salt) (1b) available from AVANTI POLAR LIPIDS, Inc. (USA).
DSPE-PEG(1000): N-(Carboxy-methoxypolyethylenglycol-1000)-1,2-distearoyl-sn-glycero-3-phospoethanolamine, ammonium salt) (1c) available from AVANTI POLAR LIPIDS, Inc. (USA).
DDPC: 1,2-didecanoyl-sn-glycero-3-phosphocholine; available from AVANTI POLAR LIPIDS, Inc. (USA).
DMPC: dimyristoylphosphatidylcholine; available from AVANTI POLAR LIPIDS, Inc. (USA).
DLPC: 1,2-dilauroyl-sn-glycero-3-phosphocholine; available from AVANTI POLAR LIPIDS, Inc. (USA).
Soybean lecithin Lipoid S 100 (2), available from LIPOID AG (CH)

Molds:
Re-usable Lightstream molds (designed according patent U.S. Pat. No. 6,800,225) are made of glass or PMMA, respectively, for female and quartz or $CaF_2$ for male molds.

Lens Production:
UV crosslinking is performed by irradiation of the molds, filled with the appropriate formulation, by an UV light source.

Evaluations:
Mold separation force (MSF) is the force which is needed to open a mold pair after the contact lens is manufactured. The MSF is measured by a tensile testing machine (Zwick 2.5). In the test set-up one mold half is rigidly fixed, the other mold half is fixed in a double cardanic mounting to enable force-free alignment. Relative mold opening force is the ratio of the MSF for a formulation that contains an additive to the force needed for the control formulation without additive.

The resulting lenses are checked visually for transmittance and wettability and rubbed with finger tips to determine the lubricity.

Water contact angle (WCA) measurements are performed by the sessile drop method with a DSA 10 drop shape analysis system from Krüss GmbH, Germany with pure water (Fluka, surface tension 72.5 mN/m at 20° C.). For measurement purposes a contact lens is taken off the storage solution with tweezers and excess storage solution is removed by gentle shaking. The contact lens are placed on the male part of a lens mold and gently blotted with a dry and clean cloth. A water droplet (approximately 1 µl) is then dosed on the lens apex, and the change of the contact angle over time of this water droplet (WCA(t), circle fitting mode) was monitored. The WCA was calculated by the extrapolation of the graph WCA (t) to t=0.

Example 1

(1a) Preparation of PDMS Crosslinker I

In a 4-L beaker, 24.13 g of $Na_2CO_3$, 80 g of NaCl and 1.52 kg of deionized water are mixed to dissolve. In a separate 4-L beaker, 700 g of bis-3-aminopropyl-polydimethylsiloxane (Shin-Etsu, MW ca. 11500) are dissolved in 1000 g of hexane. A 4-L reactor is equipped with overhead stirring with turbine agitator and a 250-mL addition funnel with micro-flow controller. The two solutions are then charged to the reactor, and mixed for 15 minutes with heavy agitation to produce an emulsion. 14.5 g of acryloyl chloride are dissolved in 100 mL of hexane and charged to the addition funnel. The acryloyl chloride solution is added dropwise to the emulsion under heavy agitation over one hour. The emulsion is stirred for 30 minutes on completion of the addition and then agitation is stopped and the phases are allowed to separate overnight. The aqueous phase is decanted and the organic phase is washed twice with a mixture of 2.0 kg of 2.5% NaCl dissolved in water. The organic phase is then dried over magnesium sulfate, filtered to 1.0 .mu.m exclusion, and concentrated on a rotary evaporator. The resulting oil is further purified by high-vacuum drying to constant weight. Analysis of the resulting product by titration reveals 0.175 mEq/g of C=C double bonds.

(1b) Preparation of PDMS Crosslinker II

In a 4-L beaker, 61.73 g of $Na_2CO_3$, 80 g of NaCl and 1.52 kg of deionized water are mixed to dissolve. In a separate 4-L beaker, 700 g of bis-3-aminopropyl-polydimethylsiloaxane (Shin-Etsu, MW ca. 4500) are dissolved in 1000 g of hexane. A 4-L reactor is equipped with overhead stirring with turbine agitator and a 250-mL addition funnel with micro-flow controller. The two solutions are then charged to the reactor, and mixed for 15 minutes with heavy agitation to produce an emulsion. 36.6 g of acryloyl chloride is dissolved in 100 mL of hexane and charged to the addition funnel. The acryloyl chloride solution is added dropwise to the emulsion under heavy agitation over one hour. The emulsion is stirred for 30 minutes on completion of the addition and then agitation is stopped and the phases are allowed to separate overnight. The aqueous phase is decanted and the organic phase is washed twice with a mixture of 2.0 kg of 2.5% NaCl dissolved in water. The organic phase is then dried over magnesium sulfate, filtered to 1.0 .mu.m exclusion, and concentrated on a rotary evaporator. The resulting oil is further purified by high-vacuum drying to constant weight. Analysis of the resulting product by titration reveals 0.435 mEq/g of C=C double bonds.

(1c) Preparation of the Crosslinkable Copolymer A

A 2-L jacketed reactor is equipped with a heating/chilling loop, reflux condenser, $N_2$-inlet/vacuum adapter, feeding tube adapter and overhead mechanical stirring. A solution is generated by dissolving 90.00 g of PDMS crosslinker I according to (1a) and 30.00 g of PDMS crosslinker II according to (1b) in 480 g of 1-propanol. This solution is charged to the reactor and cooled to 8.degree. C. The solution is degassed by evacuating to less than 15 mBar, holding at vacuum for 15 minutes, and then re-pressurizing with dry nitrogen. This degas procedure is repeated for a total of 3 times. The reactor is held under a blanket of dry nitrogen.

In a separate flask, a monomer solution is prepared by mixing 1.50 g of cysteamine hydrochloride, 0.3 g of AIBN, 55.275 g of DMA, 18.43 g of HEA and 364.5 g of 1-propanol. This solution is filtered with a Waterman 540 filter paper, and then added to the reactor through a degas unit and HPLC pump with a flow rate of 3.0 mL/minute. The reaction temperature is then elevated to 68.degree. C. with a heating ramp about one hour.

In a second flask, a feeding solution is prepared by mixing 4.5 g of cysteamine hydrochloride and 395.5 g of 1-propanol and then filtering with Waterman 540 filter paper. When the reactor temperature reaches 68.degree. C., this solution is slowly dosed into the reactor through the degasser/HPLC pump over 3 hours. The reaction is then continued at 68.degree. C. for an additional 3 hours, on which heating has discontinued and the reactor is allowed to cool to room temperature.

The reaction mixture is transferred to a flask and stripped solvent at 40.degree. C. under vacuum on a rotary evaporator until 1000 g of sample remained. The solution is then slowly mixed with 2000 g of deionized water with rapid agitation. Additional solvent is further removed until about 2000 g of sample remain. During this stripping process, the solution gradually becomes an emulsion. The resulting material is purified by ultrafiltration over a 10 kD molecular weight cut-off membrane until the permeate conductance is below 2.5 .mu.S/cm.

This emulsion is then charged to a 2-L reactor equipped with overhead stirring, refrigeration loop, thermometer, and the pH meter and dispensing tip of a Metrohm Model 718 STAT Titrino. The reaction mixture is then cooled to 1.degree. C. 7.99 g of $NaHCO_3$ are charged to the emulsion and stirred to dissolve. The Titrino is set to maintain pH at 9.5 by intermittent addition of 15% sodium hydroxide solution. 11.59 mL of acryloyl chloride are then added over one hour using a syringe pump. The emulsion is stirred for another hour, then the Titrino is set to neutralize the reaction mixture by addition of a 15% solution of hydrochloric acid. The product is purified by ultrafiltration again with 10 kD molecular weight cut-off membrane until the permeate conductance is below 2.5 .mu.S/cm. The final macromonomer is isolated by lypophilization.

(1d) Preparation of the Example 1 Basic Formulation.

A mixture of 12.13 g of a Crosslinkable Copolymer A produced by the procedure described in (1c), 3.006 g of a solution of Irgacure 2959 (1.00% w/w) in 1-Propanol and 4.881 g of 1-Propanol were stirred over night by a magnetic bar at approx. 25° C. The resulted mixture is identified as Example 1 basic formulation.

Example 2

(2a) Preparation of PDMS Crosslinker III

In a 4-L beaker, 24.13 g of $Na_2CO_3$, 80 g of NaCl and 1.52 kg of deionized water are mixed to dissolve. In a separate 4-L beaker, 700 g of bis-3-aminopropyl-polydimethylsiloxane (Shin-Etsu, MW ca. 11500) are dissolved in 1000 g of hexane. A 4-L reactor is equipped with overhead stirring with turbine agitator and a 250-mL addition funnel with micro-flow controller. The two solutions are then charged to the reactor, and mixed for 15 minutes with heavy agitation to produce an emulsion. 14.5 g of acryloyl chloride are dissolved in 100 mL of hexane and charged to the addition funnel. The acryloyl chloride solution is added dropwise to the emulsion under heavy agitation over one hour. The emulsion is stirred for 30 minutes on completion of the addition and then agitation is stopped and the phases are allowed to separate overnight. The aqueous phase is decanted and the organic phase is washed twice with a mixture of 2.0 kg of 2.5% NaCl dissolved in water. The organic phase is then dried over magnesium sulfate, filtered to 1.0 .mu.m exclusion, and concentrated on a rotary evaporator. The resulting oil is further purified by high-vacuum drying to constant weight. Analysis of the resulting product by titration reveals 0.175 mEq/g of C.dbd.C double bonds.

(2b) Preparation of PDMS Crosslinker IV

In a 4-L beaker, 61.73 g of Na.sub.2CO.sub.3, 80 g of NaCl and 1.52 kg of deionized water are mixed to dissolve. In a separate 4-L beaker, 700 g of bis-3-aminopropyl-polydimethylsiloaxane (Shin-Etsu, MW ca. 4500) are dissolved in 1000 g of hexane. A 4-L reactor is equipped with overhead stirring with turbine agitator and a 250-mL addition funnel with micro-flow controller. The two solutions are then charged to the reactor, and mixed for 15 minutes with heavy agitation to produce an emulsion. 36.6 g of acryloyl chloride is dissolved in 100 mL of hexane and charged to the addition funnel. The acryloyl chloride solution is added dropwise to the emulsion under heavy agitation over one hour. The emulsion is stirred for 30 minutes on completion of the addition and then agitation is stopped and the phases are allowed to separate overnight. The aqueous phase is decanted and the organic phase is washed twice with a mixture of 2.0 kg of 2.5% NaCl dissolved in water. The organic phase is then dried over magnesium sulfate, filtered to 1.0 .mu.m exclusion, and concentrated on a rotary evaporator. The resulting oil is further purified by high-vacuum drying to constant weight. Analysis of the resulting product by titration reveals 0.435 mEq/g of C.dbd.C double bonds.

(2c) Preparation of the Crosslinkable Copolymer B

A 2-L jacketed reactor is equipped with a heating/chilling loop, reflux condenser, N.sub.2-inlet/vacuum adapter, feeding tube adapter and overhead mechanical stirring. A solution is generated by dissolving 90.00 g of PDMS crosslinker III produced by the procedure described in (2a) and 30.00 g of PDMS crosslinker IV produced by the procedure described in (2b) in 480 g of 1-propanol. This solution is charged to the reactor and cooled to 8.degree. C. The solution is degassed by evacuating to less than 15 mBar, holding at vacuum for 15 minutes, and then re-pressurizing with dry nitrogen. This degas procedure is repeated for a total of 3 times. The reactor is held under a blanket of dry nitrogen.

In a separate flask, a monomer solution is prepared by mixing 1.50 g of cysteamine hydrochloride, 0.3 g of AIBN, 55.275 g of DMA, 18.43 g of HEA and 364.5 g of 1-propanol. This solution is filtered with a Waterman 540 filter paper, and then added to the reactor through a degas unit and HPLC pump with a flow rate of 3.0 mL/minute. The reaction temperature is then elevated to 68.degree. C. with a heating ramp about one hour.

In a second flask, a feeding solution is prepared by mixing 4.5 g of cysteamine hydrochloride and 395.5 g of 1-propanol and then filtering with Waterman 540 filter paper. When the reactor temperature reaches 68.degree. C., this solution is slowly dosed into the reactor through the degasser/HPLC pump over 3 hours. The reaction is then continued at 68.degree. C. for an additional 3 hours, on which heating has discontinued and the reactor is allowed to cool to room temperature.

The reaction mixture is transferred to a flask and stripped solvent at 40.degree. C. under vacuum on a rotary evaporator until 1000 g of sample remained. The solution is then slowly mixed with 2000 g of deionized water with rapid agitation. Additional solvent is further removed until about 2000 g of sample remain. During this stripping process, the solution gradually becomes an emulsion. The resulting material is purified by ultrafiltration over a 10 kD molecular weight cut-off membrane until the permeate conductance is below 2.5 .mu.S/cm.

The purified copolymer solution is acrylated in the same manner as described in Example 3 except that 7.99 g of NaHCO.sub.3 and 11.59 mL of acryloyl chloride are used for the reaction. The product is purified by ultrafiltration again with 10 kD molecular weight cut-off membrane until the permeate conductance is below 2.5 .mu.S/cm. The final macromonomer is isolated by lypophilization.

(2d) Preparation of the Example 2 Basic Formulation.

A mixture of 32.83 g of a Crosslinkable Copolymer B produced by the procedure described in (2c), 8.224 g of a solution of Irgacure 2959 (1.00% w/w) in 1-Propanol and 8,948 g of 1-Propanol were stirred over night by a magnetic bar at approx. 25° C.

Example 3

Preparation of the Example 3 basic formulation.

A mixture of 13,13 g of a Crosslinkable Copolymer B produced by the procedure described in (2c), 0.033 mg Irgacure 2959 and 6.84 g of 2-Methyl-1-pentanol were stirred over night by a magnetic bar at approx. 25° C.

Examples 4 TO 16

Preparation of Pre-polymer Solutions with Selection of DSPE-PEG(1000), DSPE-PEG(2000), DSPE-PEG(5000) or Soybean Lecithin Lipoid S 100 as Additives and Production of Lenses as Indicated Table 1

To 3.0 g of the formulation of example 1 to 3 are added appropriate amounts of DSPE-PEG(1000), DSPE-PEG (2000), DSPE-PEG(5000) or Soybean lecithin Lipoid S 100 as indicated in table 1. The mixtures are heated up to 40° C. with stirring, kept at this temperature for 15 minutes and filtered.

An appropriate amount of the particular formulation is dosed between the appropriate female and male molds. Then the formulation was irradiated with an UV light source (4.0 mW/cm$^2$, 25 s). From the so produced contact lens the MSF was determined subsequently. The resulting lenses were loosen from the molds and extracted by EtOH, packed with PBS in glass vials and autoclaved. Subsequently the lenses were evaluated regarding clarity/haziness and critical defects, i.e. torn lenses, tears and starburst fractures. If appropriate, the lenses were also evaluated regarding slipperiness and water wettability visually and by water contact angle.

TABLE 1

Results

| Example | Mold pairs | Basic Formulation | Additive | Additive Concentration [% by weight on entire solution] | MSF (StDev) [N] | Relative MSF * 100 [%] | WCA [°] | Critical Defects |
|---|---|---|---|---|---|---|---|---|
| 4 | glass/quartz | Example 1 | DSPE-PEG(2000) | 2.5 | 13 (2) | 10 | 66 | no critical defects |
| 5 | glass/quartz | Example 1 | DSPE-PEG(2000) | 2.0 | 21 (4) | 29 | — | no critical defects |
| 6 (control) | glass/quartz | Example 1 | — | 0 | 131 (54) | 100 | 102 | tears, starburst fractures etc. |
| 7 | CaF2/PMMA | Example 1 | DSPE-PEG(2000) | 3.0 | 27 (8) | 12 | 92 | Almost no critical defects |
| 8 (control) | CaF2/PMMA | Example 1 | — | 0 | 220 (116) | 100 | 102 | Torn lenses, tears, starburst etc |
| 9 | glass/quartz | Example 2 | DSPE-PEG(2000) | 1.6 | 19 (4) | 10 | n.a. | no critical defects |
| 10 | glass/quartz | Example 2 | DSPE-PEG(5000) | 0.2 | 138 | 73 | n.a. | tears, starburst fractures etc. |
| 11 | glass/quartz | Example 2 | DSPE-PEG(5000) | 0.5 | — | — | n.a. | — |
| 12 | glass/quartz | Example 2 | DSPE-PEG(1000) | 3.0 | 17 (3) | 9 | n.a. | no critical defects |
| 13 | glass/quartz | Example 2 | soybean lecithin Lipoid S 100 | 5.0 | 42 | 21 | n.a. | almost no tears, starburst fractures etc. |
| 14 (control) | glass/quartz | Example 2 | — | 0 | 189 (59) | 100 | n.a. | tears, starburst fractures etc. |
| 15 | glass/quartz | Example 3 | DSPE-PEG(2000) | 1.0 | 33 (8) | 19 | n.a. | almost no tears, starburst fractures etc. |
| 16 (control) | glass/quartz | Example 3 | DSPE-PEG(2000) | 0 | 170 | 100 | n.a. | torn lenses, tears, starburst etc. |

Example 17

Preparation of the Chain-Extended Polydimethylsiloxane (CE-PDMS)

In the first step, α,ω-bis(2-hydroxyethoxypropyl)-polydimethylsiloxane (Mn=2000, Shin-Etsu, KF-6001a) is capped with isophorone diisocyanate by reacting 49.85 g of α,ω-bis(2-hydroxyethoxypropyl)-polydimethylsiloxane with 11.1 g isophorone diisocyanate (IPDI) in 150 g of dry methyl ethyl ketone in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry methyl ethyl ketone are added dropwise to the IPDI-PDMS-IPDI solution to which has been added an additional 0.063 g of DBTDL. The reactor is held for 4.5 h at 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM.

Example 18

Preparation of the Modified Organopolysiloxane Macromer 240.43 g of KF-6001, a hydroxyl-terminal poly(dimethylsiloxane) available from Shin-Etsu Silicones, was charged to a 1-L reactor equipped with stirring, thermometer, cryostat, dropping funnel, and nitrogen/vacuum inlet adapter. The silicone was dried by application of high vacuum (2×10$^{-2}$ mBar). Then, maintaining an atmosphere of dry nitrogen, 320 g of distilled methyl ethyl ketone were then added and the mixture was stirred to dissolve. 0.235 g of dibutyl tin dilaurate were added to the reactor, and the reactor was warmed to 45° C. 45.86 g of isophorone diisocyanate were charged to the addition funnel and added over 10 minutes to the reactor with moderate stirring. An exotherm to 60° C. occurred, and the reactor was then held at 60° C. for 2 hours further. 630 g of KF-6002 dissolved in 452 g of distilled MEK were then charged to the flask in one portion, and stirred until a homogeneous solution was attained. 0.235 g of dibutyl tin-dilaurate were added, and the reactor was held at 55° C. overnight under a blanket of dry nitrogen. The next day, the methyl ethyl ketone was removed by flash distillation. The reactor was cooled and 22.7 g of isocyanatoethylmethacrylate were then charged to the reactor followed by 0.235 g of dibutyl. After 3 hours, an additional 3.3 g of IEM were added and the reaction was allowed to proceed overnight. The following day, the reaction mixture was cooled to 18° C. and the product was bottled off.

Example 19

To 125 ml brown bottle, weighed 0.25 g DSPE-PEG(2000) first, then added 11.70 g 1-propanol solvent and then 11.50 g DMA. Vortexed the mixture for 3 minutes in the Mini Vortexer (Ciba Vision 31787) to make a clear solution. To the solution, added 10.25 g Tris-acrylamide and vortexed it for another 3 minutes. After that, 15.75 g CE-PDMS produced by the procedure described in Example 17, 0.50 g Darocur 1173 and 0.052 g Visitint were added accordingly. After shaking the bottle for a 10 seconds, the bottle was placed on a roller of PAULO ABBE (model No LJRM) at a speed rate 42 rpm for overnight. Then the formulation was transferred into a 30 ml Luer-Lok™ Syringe that connected Cameo 30N Syringe Filter, Nylnon, 5.0 Micron, 30 mm, 50/Pk (Catalog No. DDR50T3050). Formulation was filtered into 5 cc disposable syringes (EFD®) and submitted for lens lens casting. Lenses were cast on glass/quarts molds, utilizing the Hamamatsu lamp with an intensity of 4 mW/cm$^2$ with 330 nm filter cutoff for 27 seconds. The mold separation force (16 N) was measured on test machine Zwick Z2.5

Example 20

To 125 ml brown bottle, weighed 0.50 g, DDPC (1,2-didecanoyl-sn-glycero-3-phosphocholine) first, then added 11.50 g 1-propanol solvent and then 11.50 g DMA. Vortexed the mixture for 3 minutes in the Mini Vortexer to make a clear solution. To the solution, added 9.40 g tris-methacrylamide and vortexed it for another 3 minutes. After that, 16.50 g CE-PDMS produced by the procedure described in Example 17 and 0.25 g Darocur 1173 were added accordingly. The bottle was placed on a roller of PAULO ABBE (model No LJRM) at a speed rate 42 rpm for overnight. Then the formulation was transferred into a 30ml Luer-Lok™ Syringe that connected Cameo 30N Syringe Filter, Nylnon, 5.0 Micron, 30 mm, 50/Pk (Catalog No. DDR50T3050). Formulation was filtered into 5 cc disposable syringes (EFD®) and submitted for lens casting. Lenses were cast on glass/quarts molds, utilizing the Hamamatsu lamp with an intensity of 4 mW/cm$^2$ with 330 nm filter cutoff for 120 seconds. The mold separation force (22 N) was measured on test machine Zwick Z2.5

Example 21

Firstly 0.5 g DSPE-PEG(2000) was weighed in a 20 ml Vial. And then 24.5 g 1-propanol solvent was added and vortexed it for 3 minutes in the Mini Vortexer Ciba Vision 31787. To this vial, in turn, added 33.0 g CE-PDMS produced by the procedure described in Example 17, 17.0 g Tris-methacrylamide, 24.0 g DMA and 1.0 g Darocur 1173. The vial was rolled at PAULO ABBE model No LJRM at a speed rate 42 for a minimum of 2 hours. Then the formulation was transferred into 5 cc syringes and centrifuged at 4500 rpm for 15 min for casting without filtration. Lenses were cast in spherical, CaF2/PMMA molds, utilizing the Hamamatsu lamp with the WG335+TM297 cut off filter at an intensity of 4 mW /cm2 for 120 seconds. The mold separation force (16 N) was measured on test machine Zwick Z2.5

Example 22

Control

Sample is prepared using the same procedure for example 20 except that no L-PEG-2000 is added.

Example 23

To a 67.5% solid modified organopolysiloxane macromer produced by the procedure described in Example 18, 1-propanol solution containing 0.25% Irgacure 2959 and 1.0% water, 2.5% DMPC (dimyristoylphosphatidylcholine) was added and stirred to make a clear solution. The formulation was transferred into 5 cc disposable syringes and was dosed on glass/quartz molds with a spacer ring. The lenses was cured under 5 spot cure station with no filter condenser intensity 4.0 mW/cm$^2$ for 10 seconds. The MSF was measured 40 N on test machine Zwick Z2.5. These lenses were clear and no defects.

Example 24

To a 5 cc disposable syringe, added 0.08 g DLPC and 0.0059 Irgacure 2959 and 0.815 g 1-propanol. Vortexed the mixture for 30 seconds in the Mini Vortexer to make a clear solution. To the solution, added 1.1 g modified organopolysiloxane macromer produced by the procedure described in Example 18. Vortexed it again for 3 min. The formulation was dosed on glass/quartz molds. The lenses was cured utilizing the Hamamatsu lamp with an intensity of 4 mW/cm$^2$ with 330 nm filter cutoff for 14 seconds. The mold separation force (57 N) was measured on test machine Zwick Z2.5

TABLE 2

| Example | Mold pairs | Basic Formulation | Additive | Additive Concentration [% by weight on entire solution] | MSF [N] | Critical Defects |
|---|---|---|---|---|---|---|
| 19 | glass/quartz | Example 19 | DSPE-PEG(2000) | 0.5 | 16 | lenses are round and not hazy. No star tears, delamination or bubble with tear were found. |
| 20 | glass/quartz | Example 20 | DDPC | 1.0 | 22 | lenses are round and not hazy. No star tears, delamination or bubble with tear were found. |
| 21 | CaF$_2$/PMMA | Example 21 | DSPE-PEG(2000) | 1.0 | 16. | lenses are round and not hazy. No star tears, delamination or bubble with tear were found. |
| 22 (control) | glass/quartz | Example 22 | — | 0 | >100. | star tears, bubble with tear |
| 23 | glass/quartz | Example 23 | DMPC | 2.5 | 40 | lenses were clear No star tears, delamination or bubble with tear were found. |
| 24 | glass/quartz | Example 24 | DLPC | 4.0 | 57 | Lenses were clear and no defects found. |

What is claimed is:

1. A method for producing a contact lens, comprising: the steps of:
    (1) introducing a fluid composition into a mold for making a contact lens, wherein the fluid composition comprises a lens-forming material and a PEG-ylated phosphatidyl ethanolamines, wherein the lens-forming material is crosslinkable and/or polymerizable by actinic radiation or by heating;
    (2) crosslinking/polymerizing the lens-forming material in the mold to form a lens having a polymer matrix, wherein at least part of the PEG-ylated phosphatidyl ethanolamines migrates to the interface between the mold and the polymer matrix of the formed lens; and
    (3) separating the mold, wherein the PEG-ylated phosphatidyl ethanolamines is present in an amount sufficient to reduce an averaged mold separation force by at least about 40% in comparison with that without the PEG-ylated phosphatidyl ethanolamines.

2. The method of claim 1, where the PEG-ylated phosphatidyl ethanolamines is at least one member selected from the group consisting of PEG-ylated dipalmitoyl phosphatidylethanolamine (DPPE-PEG), PEG-ylated palmitoyloleoyl phosphatidylethanolamine (POPE-PEG), PEG-ylated dioleoyl phosphatidylethanolamine (DOPE-PEG) and PEG-ylated distearoyl phosphatidylethanolamine (DSPE-PEG).

3. The method of claim 1, where the PEG-ylated phosphatidyl ethanolamines is PEG-ylated distearoyl phosphatidylethanolamine (DSPE-PEG).

4. The method of claim 1, wherein the fluid composition comprises from 0.5% to 10% PEG-ylated phosphatidyl ethanolamines.

5. The method of claim 4, wherein the fluid composition comprises from 1.0% to 6.0% PEG-ylated phosphatidyl ethanolamines.

6. The method of claim 5, wherein the fluid composition comprises from 1.5% to 4.0% PEG-ylated phosphatidyl ethanolamines.

7. The method of claim 1, wherein the lens-forming material comprises at least one prepolymer.

8. The method of claim 7, wherein the prepolymer is a silicone-containing prepolymer.

9. The method of claim 8, wherein the silicone-containing prepolymer is capable of forming, in the absence of any monomer and/or crosslinking agent, a silicone hydrogel contact lens which has at least one property selected from the group consisting of an apparent oxygen permeability of at least 40 barrers, an Ionoflux Diffusion Coefficient, D, of greater than about $1.5 \times 10^{-6}$ mm$^2$/min, an elastic modulus of from about 0.2 MPa to about 2.0 MPa, and a water content of from about 15% to about 80% by weight when fully hydrated.

10. The method of claim 9, wherein the prepolymer is a water-soluble silicone-free prepolymer.

11. The method of claim 1, wherein the lens-forming material comprises at least one prepolymer with two or more thiol groups or with two or more ene-containing groups.

12. The method of claim 1, wherein the fluid composition comprises at least one components selected from the group consisting of a polymerization initiator, a visibility tinting agent, a UV-blocking (absorbing) agent, a photosensitizer, an antimicrobial agent, a bioactive agent, a mold releasing agent, and a leachable lubricant.

13. The method of claim 1, wherein the step of crosslinking and/or polymerizing is performed under a spatial limitation of actinic radiation to form a contact lens having a first surface, an opposite second surface, and an edge, wherein the mold is a reusable mold having two molding surfaces, wherein the first and second surfaces are defined by the two molding surface, and the edge is defined by the spatial limitation of actinic radiation.

14. A method for improving quality and production yield of contact lenses, comprising the steps of: adding a PEG-ylated phosphatidyl ethanolamines into a fluid composition including a lens-forming material in an amount sufficient to reduce an averaged mold separation force by at least about 40% in comparison with that without the PEG-ylated phosphatidyl ethanolamines, wherein the lens-forming material is crosslinkable and/or polymerizable by actinic radiation or by heating in a mold to form a contact lens having a polymer matrix.

* * * * *